2 Sheets—Sheet 1.
HARRAH, BALDWIN & JONES.
Grain-Drill.
No. { 2,141, 33,145. }
Patented Aug. 27, 1861.
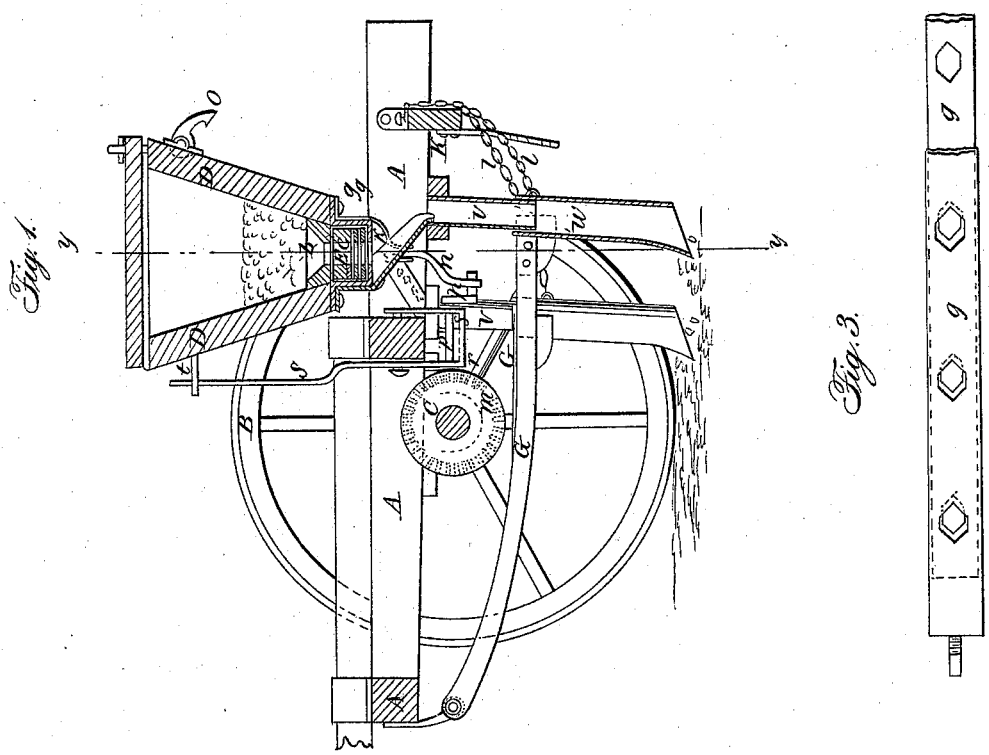
Witnesses:
J. W. Coombs
R. S. Spencer
Inventor:
W. D. Harrah
B. S. Baldwin
H. P. Jones
per Munn & Co
Attorneys.

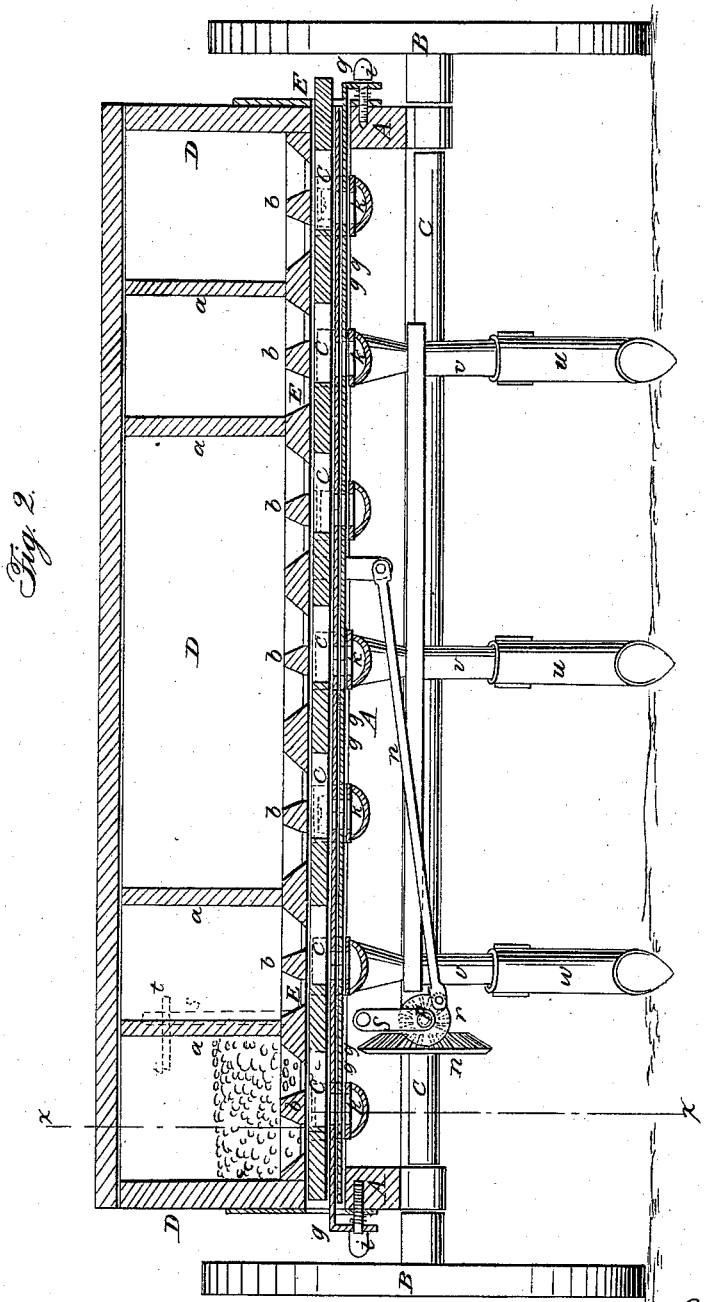

UNITED STATES PATENT OFFICE.

W. D. HARRAH, B. S. BALDWIN, AND H. P. JONES, OF DAVENPORT, IOWA.

IMPROVEMENT IN SEED-DRILLS.

Specification forming part of Letters Patent No. 33,145, dated August 27, 1861.

*To all whom it may concern:*

Be it known that we, W. D. HARRAH, B. S. BALDWIN, and H. P. JONES, all of Davenport, in the county of Scott and State of Iowa, have invented a new and Improved Seed-Drill; and we do hereby declare that the following is a full, clear, and exact description thereof, reference being had to the accompanying drawings, making a part of this specification, in which—

Figure 1 is a longitudinal section through the improved machine, taken in the vertical plane indicated by red line $x\,x$ in Fig. 2. Fig. 2 is a transverse section through the machine, taken in the vertical plane indicated by red line $y\,y$ in Fig. 1. Fig. 3 shows portions of the two adjustable perforated plates which are arranged in the bottom of the seed-hopper.

Similar letters of reference indicate corresponding parts in the three figures.

This invention relates to certain novel improvements in that class of seed sowing machines wherein a long horizontal hopper is used, divided into several compartments for different varieties of seed—such as wheat, corn, and other seeds which are planted in rows or drills—and wherein seed-tubes, stationary and movable, are used to properly distribute in drills the seed falling from the hopper.

To enable those skilled in the art to make and use our invention, we will proceed to describe its construction and operation.

A represents the quadrangular frame of the machine, supported on two carriage-wheels, B B', which are on a transverse axle, C. One of these wheels B B' is keyed fast to the axle C, while the other wheel turns loosely on its axle. The axle C is therefore rotated when the machine is moved along.

D is a long hopper-box, which extends across the back part of frame A, and which is permanently secured to this frame. This hopper is divided into several small compartments by the partitions $a\,a\,a\,a$, so that different varieties of seeds may be put into the hopper and distributed therefrom without getting mixed. The bottom of hopper D has a number of perforations through it, which are made at uniform distances apart and in pairs, having a cut-off, $b$, between each pair, which prevents more than the proper quantity of seed escaping at a time. The perforations through the hopper-bottom are beveled downward, so that the seed will flow freely from the hopper.

E represents the seed-slide, having a number of oblong holes, $c\,c$, through it, which are made at regular distances apart from end to end of the slide. This seed-slide receives an endwise movement, and as the holes $c\,c$ play back and forth under each pair of holes through the bottom of the hopper the seed is alternately dropped from the hole on each side of the cut-off portions $b\,b\,b$ into the oblong holes $c\,c$ through the slide, from whence the seed are dropped through holes through the thin plates $g\,g$ into the seed-tubes $v\,v\,v$, which finally conduct the seed into the soil, as will be hereinafter described. The two plates $g\,g$ are arranged one on the other, and they extend the entire length of the hopper D. The holes through these plates are hexagonal, as shown in Fig. 3 of the drawings, and these holes are directly below the cut-off portions $b\,b\,b$ in the bottom of the hopper. The hexagonal holes through the two plates $g\,g$ are made smaller or larger, as it is found desirable, by adjusting the plates $g\,g$ endwise. This is done by means of the set-screws $i\,i$, which pass through the perpendicular ends of the plates $g\,g$ and screw into the frame A, as shown in Fig. 2 of the drawings. The two adjustable plates $g\,g$ and the seed-slide E are supported at intermediate points between the sides of frame A by metal straps $k\,k\,k$, which are secured at their ends to the bottom edges of the seed-hopper.

The seed-slide E receives its movement from a bevel-spur wheel, $m$, which is keyed to the axle C through the medium of pitman $n$, crank $p$, shaft $p'$, and pinion bevel-wheel $r$. The crank-shaft $p'$, carrying the pinion $r$, has its bearings in the lower end of a hand-lever, $s$, which is pivoted to a transverse bar of frame A in front of the hopper, as shown in Fig. 1 of the drawings. The upper end of lever $s$ is held in a notch in plate $t$ when the machine is in operation, and this keeps the wheel $r$ in gear with wheel $m$; but when it is desired to stop the motion of the seed-slide E, and at the same time to keep the machine moving, the lever $s$ is moved out of the notch in plate $t$ and pushed to one side, so as to disengage the gear-wheels $m$ and $r$.

The seed-tubes consist of stationary tubes $v\,v\,v$, into which the seed are conducted after they leave the seed-slide E, and movable tubes $w\,w\,w$, which are secured on the rear ends of pivoted swinging arms G G G. These movable tubes *w w w* are made large enough to receive the lower ends of the stationary tubes, and their lower ends are pointed, so as to form furrows in the earth for the reception of the seed. The lower ends of tubes *v v v* are introduced into the upper ends of movable tubes *w w w*, so that the seed falls through these latter tubes into the furrows made by them. The pivoting of the arms of tubes *w w w* allows these tubes to rise and fall and accommodate themselves to the uneven surface of the land over which they are drawn. The movable tubes *w w w* are all attached by chains *l l l* to a transverse swinging beam, K, which is pivoted at its ends to the projecting rear ends of frame A, and when the machine is in operation this beam K hangs down, as shown in Fig. 1; but when the machine is moved about from place to place the tubes *w w w* are all raised from the ground by turning beam K up against the hopper D and securing it there by the hooked catch *o*. (Shown in Fig. 1.)

Having thus described our invention, what we claim as new, and desire to secure by Letters Patent, is—

The arrangement, with the box D, slide E, adjustable perforated plates *g g*, tubes *v v v*, and adjustable tubes *w w w*, of the pitman *n*, crank *p*, adjustable pendulous lever *s*, gear-wheels *m r*, and shaft C, all as herein shown and described, for the purpose set forth.

W. D. HARRAH.
     B. S. BALDWIN.
     H. P. JONES.

Witnesses:
 C. G. BLOOD,
 J. C. TEAGARDEN.